United States Patent
Hamachi

(10) Patent No.: US 10,844,311 B2
(45) Date of Patent: *Nov. 24, 2020

(54) LUBRICATING OIL COMPOSITION, LUBRICATING METHOD, AND TRANSMISSION

(71) Applicant: IDEMITSU KOSAN CO., LTD., Chiyoda-ku (JP)

(72) Inventor: Tatsuya Hamachi, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/081,580

(22) PCT Filed: Mar. 2, 2017

(86) PCT No.: PCT/JP2017/008357
§ 371 (c)(1),
(2) Date: Aug. 31, 2018

(87) PCT Pub. No.: WO2017/150688
PCT Pub. Date: Sep. 8, 2017

(65) Prior Publication Data
US 2019/0085258 A1    Mar. 21, 2019

(30) Foreign Application Priority Data

Mar. 4, 2016 (JP) .................. 2016-042508

(51) Int. Cl.
| | | |
|---|---|---|
| *C10M 169/04* | (2006.01) | |
| *C10M 145/14* | (2006.01) | |
| *F16H 57/04* | (2010.01) | |
| *C10M 101/02* | (2006.01) | |
| *F16C 33/10* | (2006.01) | |
| *F16C 33/66* | (2006.01) | |
| *C10N 20/02* | (2006.01) | |
| *C10N 20/04* | (2006.01) | |
| *C10N 30/02* | (2006.01) | |
| *C10N 30/00* | (2006.01) | |
| *C10N 40/04* | (2006.01) | |

(52) U.S. Cl.
CPC ...... *C10M 169/041* (2013.01); *C10M 101/02* (2013.01); *C10M 145/14* (2013.01); *F16H 57/04* (2013.01); *C10M 2203/1006* (2013.01); *C10M 2207/026* (2013.01); *C10M 2209/084* (2013.01); *C10M 2215/04* (2013.01); *C10M 2215/28* (2013.01); *C10M 2219/046* (2013.01); *C10N 2020/02* (2013.01); *C10N 2020/04* (2013.01); *C10N 2030/02* (2013.01); *C10N 2030/68* (2020.05); *C10N 2040/04* (2013.01); *F16C 33/10* (2013.01); *F16C 33/66* (2013.01)

(58) Field of Classification Search
CPC .......... C10N 2240/04; C10N 2220/022; C10N 2220/033; C10N 2020/02; C10N 2020/04; C10N 2030/02; C10N 2040/042; C10M 2205/003
See application file for complete search history.

(56) References Cited

U.S. PATENT DOCUMENTS

| | | |
|---|---|---|
| 3,803,948 A | 4/1974 | Clauss, Jr. et al. |
| 5,416,162 A | 5/1995 | Gore et al. |
| 2007/0191239 A1 | 8/2007 | Matsuoka et al. |
| 2010/0093576 A1 | 4/2010 | Maruyama et al. |
| 2011/0003725 A1* | 1/2011 | Matsui ............... C10M 169/041 508/463 |
| 2011/0053815 A1 | 3/2011 | Matsui et al. |
| 2011/0124536 A1* | 5/2011 | Matsui ................ C10M 169/04 508/110 |
| 2011/0294708 A1 | 12/2011 | Narita |
| 2012/0108481 A1* | 5/2012 | Nagatomi ........... C10M 145/14 508/496 |

FOREIGN PATENT DOCUMENTS

| | | |
|---|---|---|
| JP | 7-102023 A | 4/1995 |
| JP | 2004-149794 A | 5/2004 |
| JP | 2006-117854 A | 5/2006 |
| JP | 2008-133440 A | 6/2008 |
| JP | 2009-167277 A | 7/2009 |
| JP | 2009-179694 A | 8/2009 |
| JP | 2009-256665 A | 11/2009 |
| JP | 2010-285471 A | 12/2010 |
| JP | 2014-152316 A | 8/2014 |
| JP | 2015-172165 A | 10/2015 |
| WO | WO 2009/095483 A2 | 8/2009 |

OTHER PUBLICATIONS

Office Action dated Oct. 8, 2019 in corresponding Japanese Patent Application No. 2016-042508 (with English Translation), 5 pages.
Extended European Search Report dated Jul. 17, 2019, in Patent Application No. 17760151.5, citing documents AA-AB and AO therein, 6 pages.
International Search Report dated May 16, 2017 in PCT/JP2017/008357 filed Mar. 2, 2017.

* cited by examiner

*Primary Examiner* — Vishal V Vasisth
(74) *Attorney, Agent, or Firm* — Oblon, McClelland, Maier & Neustadt, L.L.P.

(57) ABSTRACT

Provided are a lubricating oil composition containing a mineral oil (1) having a kinematic viscosity at 100° C. of 2 $mm^2/s$ or more and less than 2.5 $mm^2/s$, and a polymethacrylate (2) having a functional group containing an oxygen atom in the molecule while having a specific structural unit, which satisfies both high viscosity index and high shear stability, and a lubrication method and a transmission using the lubricating oil composition.

20 Claims, No Drawings

LUBRICATING OIL COMPOSITION, LUBRICATING METHOD, AND TRANSMISSION

CROSS-REFERENCE TO RELATED APPLICATIONS

This application is a National Stage of PCT/JP2017/008357, which was filed on Mar. 2, 2017. This application is based upon and claims the benefit of priority to Japanese Application No. 2016-042508, which was filed on Mar. 4, 2016.

TECHNICAL FIELD

The present invention relates to a lubricating oil composition, and to a lubrication method and a transmission using the lubricating oil composition.

BACKGROUND ART

Recently, with the increase in the consciousness of environmental issues, requirements for fuel saving in various technical fields are being severer, for the purpose of more effective use of oil resources and reduction in $CO_2$ emission. For example, for lubricating oil compositions for use in transmissions, requirements for fuel saving are increasing. PTL 1 proposes a lubricating oil composition obtained by blending the base oil with two kinds of polymethacrylates differing in the molecular weight.

CITATION LIST

Patent Literature

PTL 1: JP 2015-172165 A

DISCLOSURE OF INVENTION

Technical Problem

For attaining fuel saving, for example, a lubricating oil composition for transmissions is required to satisfy the characteristics in that the viscosity thereof hardly increases so as not to increase too much the stirring resistance at low temperatures but that, on the other hand, the viscosity thereof hardly decreases so as to sufficiently maintain an oil film at high temperatures. The viscosity characteristics can be attained, for example, by increasing the viscosity index of a lubricating oil composition, and a viscosity index improver such as polymethacrylate as described in PTL 1 is used.

The viscosity index improving performance of a viscosity index improver generally bears a proportional relationship to the mean molecular weight thereof, and the performance tends to increase with the increase in the mean molecular weight. On the other hand, when having a large mean molecular weight, the molecular chain of the viscosity index improver may be cut owing to the mechanical shear force to be given to the lubricating oil composition during use so that the performance thereof may lower with the result that the viscosity of the lubricating oil composition lowers and an oil film could not be sufficiently maintained and therefore the performance of the lubricating oil composition worsens. Specifically, it may be said that a high viscosity index and high shear stability are contradictory to each other.

For attaining high fuel saving performance, a lubricating oil composition is required to satisfy both the contradictory properties of high viscosity index and high shear stability. However, the viscosity index improver such as a polymethacrylate as used in PTL 1 could hardly satisfy both the contradictory properties on a higher level.

The present invention has been made in consideration of the above-mentioned situation, and its object is to provide a lubricating oil composition satisfying both the requirements of high viscosity index and high shear stability, and to provide a lubrication method and a transmission using the lubricating oil composition.

Solution to Problem

As a result of assiduous studies, the present inventor has found that the following invention can solve the above-mentioned problems. Specifically, the present invention provides a lubricating oil composition having the constitution mentioned below, and a lubrication method and a transmission using the lubricating oil composition.

1. A lubricating oil composition containing a mineral oil (1) having a kinematic viscosity at 100° C. of 2 mm²/s or more and less than 2.5 mm²/s, and a polymethacrylate (2) having a functional group containing an oxygen atom in the molecule, which has a structural unit represented by the following general formula (I):

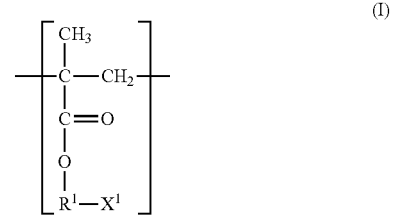

wherein $R^1$ represents a divalent aliphatic hydrocarbon group having 24 to 40 carbon atoms, and $X^1$ represents a monovalent functional group containing an oxygen atom.

2. A lubrication method using the lubricating oil composition of the above 1.

3. A transmission using the lubricating oil composition of the above 1.

Advantageous Effects of Invention

According to the present invention, there are provided a lubricating oil composition that satisfies both high viscosity index and high shear stability, and a lubrication method and a transmission using the lubricating oil composition.

DESCRIPTION OF EMBODIMENTS

Hereinunder, embodiments of the present invention (also referred to as "the present embodiments") are described. In this description, the numerical values regarding "or more" and "or less" relating to the description of a numerical value range are values that can be combined arbitrarily.

[Lubricating Oil Composition]

The lubricating oil composition of the present embodiment is a lubricating oil composition containing a mineral oil (1) having a kinematic viscosity at 100° C. of 2 mm²/s or more and less than 2.5 mm²/s (hereinafter may be referred to as "mineral oil (1)"), and a polymethacrylate (2) having a functional group containing an oxygen atom in the molecule, which has a structural unit represented by the above-mentioned general formula (I) (hereinafter may be referred to as "polymethacrylate (2)"). Each component is described below.
(Mineral Oil (1))

With no specific limitation thereon, the mineral oil may be any mineral oil whose kinematic viscosity at 100° C. falls within the above-mentioned range. Examples of the mineral oil include topped crudes obtained through atmospheric distillation of crude oils such as paraffin base crude oils, naphthene base crude oils or intermediate base crude oils; distillates obtained through vacuum distillation of such topped crudes; mineral oils obtained by purifying the distillates through one or more purification treatments of solvent deasphalting, solvent extraction, hydrocracking, solvent dewaxing, catalytic dewaxing or hydrorefining, for example, light neutral oils, medium neutral oils, heavy neutral oils, and bright stocks; and mineral oils obtained by isomerizing wax produced through Fischer-Tropsch synthesis (GTL wax (Gas To Liquids WAX)).

As the mineral oil, those grouped in any of Groups 1, 2 and 3 in the base oil category by API (American Petroleum Institute) may be used, but those grouped in Groups 2 and 3 are preferred.

The kinematic viscosity at 100° C. of the mineral oil (1) is 2 mm²/s or more and less than 2.5 mm²/s. Using one whose kinematic viscosity at 100° C. falls within the above-mentioned range can readily satisfy both high viscosity index and high shear stability. From the same viewpoint, the kinematic viscosity at 100° C. of the mineral oil (1) is preferably 2.05 mm²/s or more, more preferably 2.1 mm²/s or more. It is also preferably 2.45 mm²/s or less, more preferably 2.4 mm²/s or less.

The kinematic viscosity at 40° C. of the mineral oil (1) is preferably 6 mm²/s or more, more preferably 6.5 mm²/s or more, even more preferably 6.8 mm²/s or more. The upper limit is preferably 11 mm²/s or less, more preferably 10 mm²/s or less, even more preferably 9 mm²/s or less. Using the mineral oil (1) whose kinematic viscosity at 40° C. falls within the above-mentioned range can readily satisfy both high viscosity index and high shear stability.

Also from the viewpoint of readily attaining both high viscosity index and high shear stability, the viscosity index of the mineral oil (1) is preferably 90 or more, more preferably 100 or more, even more preferably 105 or more.

Here, the kinematic viscosity and the viscosity index are values measured using a glass capillary viscometer according to JIS K 2283:2000.

The content of the mineral oil (1) based on the total amount of the lubricating oil composition is generally 50% by mass or more, preferably 60% by mass or more, more preferably 65% by mass or more, even more preferably 70% by mass or more. The upper limit is preferably 97% by mass or less, more preferably 95% by mass or less, even more preferably 90% by mass or less. When the content of the mineral oil (1) falls within the above range, both high viscosity index and high shear stability can be readily attained.

Synthetic oils such as poly-α-olefins such as polybutene, ethylene-α-olefin copolymers, and α-olefin homopolymers or copolymers; various esters such as polyol esters, dibasic acid esters, and phosphates; various ethers such as polyphenyl ethers; polyglycols; alkylbenzenes; and alkylnaphthalenes may also be used within a range not detracting from the advantageous effects of the present invention.

(Polymethacrylate (2))

The polymethacrylate has a structural unit represented by the following general formula (I), and therefore has a monovalent functional group containing an oxygen atom in the molecule.

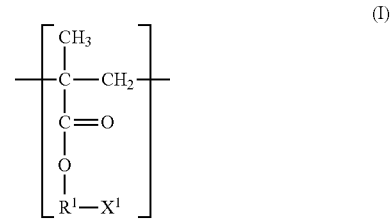

In the general formula (I), $R^1$ represents a divalent aliphatic hydrocarbon group having 24 to 40 carbon atoms, and $X^1$ represents a monovalent functional group containing an oxygen atom. Here, when the carbon number of $R^1$ is 23 or less, there may occur a problem in point of attaining high viscosity index, and on the other hand, when the carbon number is 41 or more, there may occur a problem in point of attaining high shear stability.

The divalent aliphatic hydrocarbon group having 24 to 40 carbon atoms for $R^1$ includes an alkylene group and an alkenylene group, and from the viewpoint of readily attaining high viscosity index and high shear stability, an alkylene group is preferred. The group may be linear, branched or cyclic, but from the viewpoint of more readily attaining both high viscosity index and high shear stability, a linear or branched group is preferred. Also from the same viewpoint, the carbon number is preferably 28 to 40, more preferably 30 to 40.

Examples of the alkylene group having 24 to 40 carbon atoms include various tetracosylene groups such as an n-tetracosylene group, an isotetracosylene group, and isomers thereof (hereinunder functional groups having predetermined carbon atoms including linear and branched ones and isomers thereof may be abbreviated as various functional groups), various pentacosylene groups, various hexacosylene groups, various heptacosylene groups, various octacosylene groups, various nonacosylene groups, various triacontylene groups, various hentriacontylene groups, various dotriacontylene groups, various tritriacontylene groups, various tetratriacontylene groups, various pentatriacontylene groups, various hexatriacontylene groups, various heptatriacontylene groups, various octatriacontylene groups, various nonatriacontylene groups, and various tetracontylene groups.

In the general formula (I), $X^1$ represents a monovalent functional group containing an oxygen atom. When the substituent is not a monovalent functional group containing an oxygen atom, high viscosity index and high shear stability could not be attained. From the viewpoint of readily attaining both high viscosity index and high shear stability, a hydroxy group, an alkoxy group, an aldehyde group, a carboxy group, an ester group, a nitro group, an amide group, a carbamate group, a sulfo group and the like are preferred; a hydroxy group and an alkoxy group are more preferred; and a hydroxy group is even more preferred. Here, the alkoxy group is preferably one containing an alkyl group having 1 to 30 carbon atoms, and the alkyl group may be linear or branched.

The polymethacrylate (2) may have any other structural unit represented by the following general formula (II) as far as it has the structural unit represented by the above-mentioned general formula (I).

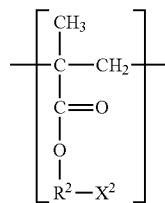

In the general formula (II), $R^2$ represents a divalent aliphatic hydrocarbon group having 1 to 40 carbon atoms, and $X^2$ represents a monovalent functional group.

The divalent aliphatic hydrocarbon group having 1 to 40 carbon atoms for $R^2$ includes, in addition to the divalent aliphatic hydrocarbon group having 24 to 40 carbon atoms exemplified for the above $R^1$, a divalent aliphatic hydrocarbon group having 1 to 23 carbon atoms. The divalent aliphatic hydrocarbon group having 1 to 23 carbon atoms is, from the viewpoint of readily attaining high viscosity index and high shear stability, preferably an alkylene group or an alkenylene group, more preferably an alkylene group. The alkylene group may be linear or branched, and more preferably has 1 to 30 carbon atoms.

Examples of the monofunctional group for $X^2$ include an aryl group such as a phenyl group, a benzyl group, a tolyl group and a xylyl group; a heterocyclic group such as a furanyl group, a thiophenyl group, a pyridinyl group and a carbazolyl group; and an organic group containing a hetero atom represented by the following general formulae (III) to (IV); and when the carbon number of $R^2$ is 1 to 23, the substituent may further include a functional group containing an oxygen atom as exemplified for the above $X^1$, in addition to these monofunctional groups.

In the general formulae (III) and (IV), $R^3$ each independently represents a hydrogen atom, or a monovalent aliphatic hydrocarbon group having 1 to 30 carbon atoms. The monovalent aliphatic hydrocarbon group is, from the viewpoint of readily attaining both high viscosity index and high shear stability, preferably an alkyl group or an alkenyl group, and is more preferably an alkyl group. The monovalent aliphatic hydrocarbon group may be linear or branched.

Having a structural unit represented by the above general formula (I), the polymethacrylate (2) is not specifically limited in point of the proportion of the structural unit, but from the viewpoint of more readily attaining both high viscosity index and high shear stability, the copolymerization ratio of the structural unit represented by the general formula (I) to, for example, any other structural unit than the structural unit represented by the general formula (I) such as the above-mentioned other structural unit (for example, the structural unit represented by the above general formula (II)) is preferably 10/90 to 90/10, more preferably 20/80 to 80/20, even more preferably 30/70 to 70/30.

The mass average molecular weight of the polymethacrylate (2) is preferably 5,000 or more, more preferably 15,000 or more, even more preferably 20,000 or more, especially preferably 25,000 or more. The upper limit is preferably 100,000 or less, more preferably 80,000 or less, even more preferably 70,000 or less, especially preferably 55,000 or less. When the mass average molecular weight of the polymethacrylate (2) falls within the above range, both high viscosity index and high shear stability can be more readily attained.

Here, the mass average molecular weight may be measured through gel permeation chromatography (GPC) and determined from the calibration curve drawn using polystyrene. For example, the mass average molecular weight of each above-mentioned polymer may be calculated as a polystyrene-equivalent value through GPC mentioned below.

<GPC Apparatus>
  Column: TOSO GMHHR-H(S)HT
  Detector: RI detector for liquid chromatography, WATERS 150C
<Measurement Conditions>
  Solvent: 1,2,4-trichlorobenzene
  Measurement temperature: 145° C.
  Flow rate: 1.0 ml/min
  Sample concentration: 2.2 mg/ml
  Injection amount: 160 μl
  Calibration curve: Universal Calibration
  Analysis program: HT-GPC (Ver. 1.0)

The content of the polymethacrylate (2) based on the total amount of the composition is generally 1% by mass or more, preferably 3% by mass or more, more preferably 5% by mass or more, even more preferably 6% by mass or more, and the upper limit is generally 15% by mass or less, preferably 12% by mass or less, more preferably 10% by mass or less, even more preferably 9% by mass or less. When the content of the polymethacrylate (2) falls within the above range, the polymethacrylate addition effect may be sufficiently attained to readily satisfy both high viscosity index and high shear stability.

(Other Additives)

In the lubricating oil composition of the present embodiment, any other additives than the mineral oil (1) and the polymethacrylate (2), for example, other additive such as a viscosity index improver, an antioxidant, a metal-based detergent, a dispersant, a friction modifier, an anti-wear agent, an extreme-pressure agent, a pour point depressant, a metal deactivator, a rust inhibitor, and an anti-foaming agent may be appropriately selected and blended in the composition within a range not conflicting with the advantageous effects of the present invention. One of these additives may be used singly or plural kinds thereof may be used in combination. The lubricating oil composition of the present embodiment may be composed of the mineral oil (1) and the polymethacrylate (2) as above, or may be composed of the mineral oil (1), the polymethacrylate (2) and other additives.

Falling within a range not conflicting with the advantageous effects of the present invention, the total content of the additives is not specifically limited but is, in consideration of the effect of the additives to be added, preferably 0.1 to 20% by mass based on the total amount of the composition, more preferably 1 to 15% by mass, even more preferably 3 to 15% by mass.

(Viscosity Index Improver)

Examples of the viscosity index improver include polymers such as olefin-based copolymers (for example, ethylene-propylene copolymers), dispersant-type olefin-based copolymers, and styrene-based copolymers (for example, styrene-diene copolymers, and styrene-isoprene copolymers).

(Antioxidant)

Examples of the antioxidant include amine-based antioxidants such as diphenylamine-based antioxidants and naphthylamine-based antioxidants; phenol-based antioxidants such as monophenol-based antioxidants, diphenol-based antioxidants, and hindered phenol-based antioxidants; molybdenum-based antioxidants such as molybdenum amine complex produced through reaction of molybdenum trioxide and/or molybdic acid and an amine compound; sulfur-based antioxidants such as phenothiazine, dioctadecyl sulfide, dilauryl-3,3'-thiodipropionate, and 2-mercaptobenzimidazole; and phosphorus-based antioxidants such as phosphite-based antioxidants such as triphenyl phosphite, diisopropylmonophenyl phosphite, and monobutyldiphenyl phosphite.

(Metal-Based Detergent)

Examples of the metal-based detergent include neutral metal sulfonates, neutral metal phenates, neutral metal salicylates, neutral metal phosphonates, basic metal sulfonates, basic metal phenates, basic metal salicylates, basic metal phosphonates, overbased metal sulfonates, overbased metal phenates, overbased metal salicylates, and overbased metal phosphonates containing an alkaline earth metal such as calcium as the metal species therein.

(Dispersant)

Examples of the dispersant include ash-free dispersants such as boron-free succinimides, boron-containing succinimides, benzylamines, boron-containing benzylamines, succinates, and mono or dicarboxylic acid amides of typically fatty acids or succinic acid.

(Friction Modifier)

Examples of the friction modifier include ash-free friction modifiers such as fatty acid amines, fatty acid esters, fatty acid amides, fatty acids, aliphatic alcohols, and fatty acid ethers having at least one alkyl or alkenyl group having 6 to 30 carbon atoms, especially a linear alkyl or alkenyl group having 6 to 30 carbon atoms in the molecule; and molybdenum-based friction modifiers such as molybdenum dithiocarbamate (MoDTC), molybdenum dithiophosphate (MoDTP), and molybdic acid amine salts.

(Anti-Wear Agent)

Examples of the anti-wear agent include sulfur-containing compounds such as zinc dialkyldithiophosphates (ZnDTP), zinc phosphate, zinc dithiocarbamate, molybdenum dithiocarbamate, molybdenum dithiophosphate, disulfides, sulfurized olefins, sulfurized oils and fats, sulfurized esters, thiocarbonates, thiocarbamates, and polysulfides; phosphorus-containing compounds such as phosphite esters, phosphate esters, phosphonate esters, and amine salts or metal salts thereof; and sulfur and phosphorus-containing anti-wear agents such as thiophosphites, thiophosphates, thiophosphonates, and amine sails or metal salts thereof.

(Extreme-Pressure Agent)

Examples of the extreme-pressure agent include sulfur-based extreme-pressure agents such as sulfides, sulfoxides, sulfones, and thiophosphinates; halogen-based extreme-pressure agents such as chlorohydrocarbons; and organic metal-based extreme pressure agents.

(Pour Point Depressant)

Examples of the pour point depressant include ethylene-vinyl acetate copolymers, condensates of chloroparaffin and naphthalene, condensates of chloroparaffin and phenol, polymethacrylates, and polyalkylstyrenes.

(Metal Deactivator)

Examples of the metal deactivator include benzotriazole compounds, tolyltriazole compounds, thiadiazole compounds, and imidazole compounds.

(Rust Inhibitor)

Examples of the rust inhibitor include petroleum sulfonates, alkylbenzene sulfonates, dinonylnaphthalene sulfonates, alkenylsuccinates, and polyalcohol esters.

(Anti-Foaming Agent)

Examples of the anti-foaming agent include silicone oils, fluorosilicone oils, and fluoroalkyl ethers.

(Various Properties of Lubricating Oil Composition)

The kinematic viscosity at 100° C. of the lubricating oil composition of the present embodiment is preferably 4 mm$^2$/s or more, more preferably 4.2 mm$^2$/s or more, even more preferably 4.5 mm$^2$/s or more, and is also preferably 7 mm$^2$/s or less, more preferably 6 mm$^2$/s or less, even more preferably 5.5 mm$^2$/s or less. The kinematic viscosity at 40° C. of the lubricating oil composition of the present embodiment is preferably 10 mm$^2$/s or more, more preferably 13 mm$^2$/s or more, even more preferably 15 mm$^2$/s or more, and is also preferably 25 mm$^2$/s or less, more preferably 22 mm$^2$/s or less, even more preferably 20 mm$^2$/s or less.

The viscosity index of the lubricating oil composition of the present embodiment is preferably 232 or more, more preferably 234 or more, even more preferably 236 or more.

Here, the methods for measuring the kinematic viscosity and the viscosity index are the same as those for the base oil mentioned above.

Having the above-mentioned kinematic viscosity and having a high viscosity index, the lubricating oil composition of the present embodiment has low stirring resistance and the viscosity thereof hardly increases at low temperatures, and on the other hand, at high temperatures, the viscosity of the composition hardly lowers so as to sufficiently maintain an oil film.

A rate of change in kinematic viscosity at 40° C. of the lubricating oil composition of the present embodiment, as measured according to the method mentioned below, is preferably 5% or less, more preferably 4.5% or less, even more preferably 4% or less. The rate of change in kinematic viscosity at 40° C. is an index of shear stability that indicates a change of kinematic viscosity before and after ultrasonic treatment, and a smaller rate of change means that the lubricating oil composition is hardly influenced by ultrasonic treatment and has higher shear stability. The lubricating oil composition of the present embodiment has a small rate of change in kinematic viscosity as mentioned above, and can express high shear stability.

(Method for Calculating Rate of Change in Kinematic Viscosity at 40° C.)

With respect to an ultrasonically-treated composition obtained by irradiating a lubricating oil composition with ultrasonic waves for 60 minutes according to JASO M347-95 and an untreated lubricating oil composition, their kinematic viscosity at 40° C. ($v_1$, $v_0$) is measured according to JIS K2283:2000. The rate of reduction (($v_0-v_1$)/$v_0 \times 100$) is referred to as the rate of change in kinematic viscosity at 40° C.

Regarding the lubricating oil composition of the present embodiment, in addition, the kinematic viscosity at 100° C. of the ultrasonically-treated composition and the untreated composition is measured and the rate of change in kinematic viscosity at 100° C. thereof is calculated according to the above-mentioned method (method for calculating rate of change in kinematic viscosity at 40° C.). Preferably, the thus-calculated rate of change is 8% or less, more preferably 7% or less, even more preferably 5.5% or less.

As described above, the lubricating oil composition of the present embodiment satisfies both high viscosity index and high shear stability, and, for example, when applied to transmissions and the like of gasoline vehicles, hybrid vehicles, electric vehicles and the like, the composition secures excellent fuel saving performance and is therefore favorably used for these uses. In addition, the lubricating oil composition is also favorably used for other uses, for example, for internal combustion engines, hydraulic machinery, turbines, compressors, working machines, cutting machines, gears, and machines equipped with liquid bearings or ball bearings.

[Lubrication Method and Transmission]

The lubrication method of the present embodiment is a lubrication method using the lubricating oil composition of the present embodiment described above. The lubricating oil composition for use in the lubrication method of the present embodiment satisfies both high viscosity index and high shear stability. Accordingly, the lubrication method of the present embodiment is favorably used, for example, for transmissions of gasoline vehicles, hybrid vehicles, electric vehicles and the like, and when used in these uses, the method exhibits excellent fuel saving performance. In addition, the lubrication method is also favorably used for other uses, for example, for lubrication of internal combustion engines, hydraulic machinery, turbines, compressors, working machines, cutting machines, gears, and machines equipped with liquid bearings or ball bearings.

The transmission of the present embodiment uses the lubricating oil composition of the present embodiment. The transmission of the present embodiment expresses excellent fuel saving performance and is widely favorably applied to various vehicles such as gasoline vehicles, hybrid vehicles and electric vehicles.

EXAMPLES

Next, the present invention is described in more detail with reference to Examples, but the present invention is not limited at all by these Examples.

Examples 1 to 3, Comparative Examples 1 and 2

Lubricating oil compositions were prepared at the blending ratio (% by mass) shown in Table 1. The resultant lubricating oil compositions were tested variously according to the methods mentioned below to evaluate the properties thereof. The evaluation results are shown in Table 1. Details of each component shown in Table 1 used in these Examples are as follows.

Mineral oil: 60 N (neutral) hydrorefined mineral oil, kinematic viscosity at 100° C.: 2.17 mm$^2$/s, kinematic viscosity at 40° C.: 7.12 mm$^2$/s, viscosity index: 109, API Group 2.

PMA-A: polymethacrylate having a functional group containing an oxygen atom in the molecule (having a structural unit represented by the general formula (I) where $R^1$ is at least one selected from an alkyl group having 24 to 40 carbon atoms, and $X^1$ is a hydroxy group), mass average molecular weight: 30,000.

PMA-B: polymethacrylate having a functional group containing an oxygen atom in the molecule (having a structural unit represented by the general formula (I) where $R^1$ is at least one selected from an alkyl group having 24 to 40 carbon atoms, and $X^1$ is a hydroxy group), mass average molecular weight: 35,000.

PMA-C: polymethacrylate having a functional group containing an oxygen atom in the molecule (having a structural unit represented by the general formula (I) where $R^1$ is at least one selected from an alkyl group having 24 to 40 carbon atoms, and $X^1$ is a hydroxy group), mass average molecular weight: 50,000.

PMA-D: polymethacrylate not having a functional group containing an oxygen atom in the molecule, mass average molecular weight: 30,000.

PMA-E: polymethacrylate not having a functional group containing an oxygen atom in the molecule, mass average molecular weight: 200,000.

Other additives: phenol-based antioxidant, metal-based detergent (overbased calcium sulfonate), dispersant (boron-free polybutenylsuccinic acid bisimide, boron-containing polybutenylsuccinic acid monoimide), friction modifier (fatty acid amine, fatty acid amide).

The properties of the lubricating oil compositions were measured according to the following methods.

(1) Kinematic Viscosity

The kinematic viscosity at 40° C. and 100° C. was measured according to JIS K 2283:2000.

(2) Viscosity Index (VI)

Measured according to JIS K 2283:2000.

(3) Calculation of Rate of Change in Kinematic Viscosity

With respect to the ultrasonically-treated composition obtained by irradiating a lubricating oil composition with ultrasonic waves for 60 minutes according to JASO M347-95 and an untreated lubricating oil composition, their kinematic viscosity at 40° C. ($v_1$, $v_0$) was measured according to JIS K2283:2000. The rate of reduction (($v_0-v_1$)/$v_0\times100$) was calculated, and this is referred to as the rate of change in kinematic viscosity at 40° C. The rate of reduction (($v_0-v_1$)/$v_0\times100$) was calculated, and this is referred to as the rate of change in kinematic viscosity at 40° C. In place of the kinematic viscosity at 40° C., the kinematic viscosity at 100° C. was measured, and the rate of change in kinematic viscosity at 100° C. was calculated.

TABLE 1

|  |  | Example | | | Comparative Example | |
|---|---|---|---|---|---|---|
|  |  | 1 | 2 | 3 | 1 | 2 |
| Mineral Oil (1) | (% by mass) | balance | balance | balance | balance | balance |
| Polymethacrylate (2) |  |  |  |  |  |  |
| PMA-A | (% by mass) | 8.00 | — | — | — | — |
| PMA-B | (% by mass) | — | 7.50 | — | — | — |
| PMA-C | (% by mass) | — | — | 7.25 | — | — |

TABLE 1-continued

|  |  | Example | | | Comparative Example | |
| --- | --- | --- | --- | --- | --- | --- |
|  |  | 1 | 2 | 3 | 1 | 2 |
| PMA-D | (% by mass) | — | — | — | 7.20 | — |
| PMA-E | (% by mass) | — | — | — | — | 3.00 |
| Other Additives | (% by mass) | 11.50 | 11.50 | 11.50 | 11.50 | 11.50 |
| Before Ultrasonic Treatment | | | | | | |
| Kinematic Viscosity at 40° C. | (mm$^2$/s) | 17.6 | 17.5 | 17.2 | 18.0 | 16.0 |
| Kinematic Viscosity at 100° C. | (mm$^2$/s) | 5.00 | 5.00 | 5.00 | 5.00 | 5.00 |
| Viscosity Index | — | 239 | 241 | 249 | 230 | 279 |
| After Ultrasonic Treatment | | | | | | |
| Kinematic Viscosity at 40° C. | (mm$^2$/s) | 17.3 | 17.0 | 16.6 | 17.5 | 13.0 |
| Kinematic Viscosity at 100° C. | (mm$^2$/s) | 4.93 | 4.88 | 4.76 | 4.89 | 3.60 |
| Rate of Change in Kinematic Viscosity at 40° C. | (%) | 1.70 | 2.86 | 3.49 | 2.78 | 18.8 |
| Rate of Change in Kinematic Viscosity at 100° C. | (%) | 1.40 | 2.40 | 4.80 | 2.20 | 28.0 |

The results of Examples 1 to 3 confirm that the lubricating oil compositions of the present embodiment all have a high viscosity index of 239, 241 or 249, and the rate of change in kinematic viscosity at 40° C. thereof was 1.70%, 2.86% or 3.49% and was extremely small, and thus, the lubricating oil compositions satisfy both high viscosity index and high shear stability. On the other hand, regarding the lubricating oil composition of Comparative Example 1 using a polymethacrylate not having a functional group containing an oxygen atom, the rate of change in kinematic viscosity at 40° C. thereof was 2.78% and was small, but the viscosity index thereof was 230 and was lower than in Examples 1 to 3, that is, the comparative composition could not be said to have a high viscosity index. When Comparative Example 1 is compared with Example 1 using a polymethacrylate having the same mass average molecular weight, the rate of kinematic viscosity reduction in the former is large, that is, the comparative composition could not be said to have high shear stability.

The lubricating oil composition of Comparative Example 2 using a polymethacrylate not having a functional group containing an oxygen atom, whose mass average molecular weight was larger than that used in Comparative Example 1, had a high viscosity index of 279, but the rate of change in kinematic viscosity at 40° C. thereof was 18.8% and was large, that is, the comparative composition could not be said to have high shear stability.

INDUSTRIAL APPLICABILITY

The lubricating oil composition and the lubrication method of the present invention is favorably used for transmissions of gasoline vehicles, hybrid vehicles, electric vehicles and the like. The transmission of the present invention is favorably used as a transmission of gasoline vehicles, hybrid vehicles and electric vehicles.

The invention claimed is:

1. A lubricating oil composition, comprising:
a mineral oil having a kinematic viscosity at 100° C. of 2 mm$^2$/s or more and less than 2.5 mm$^2$/s; and
a polymethacrylate having a functional group comprising an oxygen atom in the molecule,
wherein the polymethacrylate has a structural unit of formula (I),

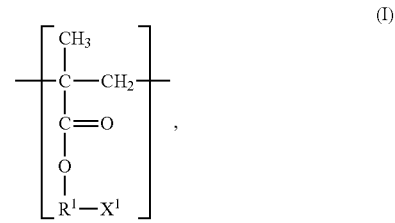

where $R^1$ is a divalent aliphatic hydrocarbon group having 24 to 40 carbon atoms, and $X^1$ is a hydroxyl group, and the polymethacrylate has a mass average molecular weight in a range of 20,000 to 70,000, and a content 5% by mass to 15% by mass based on the total amount of the lubricating oil composition.

2. The lubricating oil composition according to claim 1, wherein the mass average molecular weight of the polymethacrylate is in a range of 25,000 to 70,000.

3. The lubricating oil composition according to claim 1, wherein the content of the polymethacrylate is in a range of 5% by mass to 12% by mass based on the total amount of the lubricating oil composition.

4. The lubricating oil composition according to claim 1, wherein the lubricating oil composition is formulated to have a kinematic viscosity at 100° C. in a range of 4 mm$^2$/s to 7 mm$^2$/s.

5. The lubricating oil composition according to claim 1, wherein the lubricating oil composition is formulated to have a viscosity index of 232 or more.

6. The lubricating oil composition according to claim 1, wherein the lubricating oil composition is formulated to have a rate of change in kinematic viscosity at 40° C. of 5% or less, as calculated with respect to an ultrasonically-treated composition obtained by irradiating the lubricating oil composition with ultrasonic waves for 60 minutes according to JASO M347-95 and an untreated lubricating oil composition, their kinematic viscosity at 40° C. ($v_1$, $v_0$) being measured according to JIS K2283:2000, and where a rate of reduction (($v_0-v_1$)/$v_0 \times 100$) is a rate of change in kinematic viscosity at 40° C.

7. The lubricating oil composition according to claim 1, wherein the lubricating oil composition is formulated to have a kinematic viscosity at 100° C. in a range of 4 mm$^2$/s to 7 mm$^2$/s and a viscosity index of 232 or more.

8. A lubrication method, comprising:
applying the lubricating oil composition of claim 1 to a device.

9. The lubrication method according to claim 8, wherein the device is a transmission.

10. A transmission, comprising,
a transmission device; and
the lubricating oil composition of claim 1.

11. The lubricating oil composition according to claim 1, wherein the kinematic viscosity of the mineral oil at 100° C. is in a range of 2 mm²/s 2.4 mm²/s.

12. The lubricating oil composition according to claim 1, Wherein the mass average molecular weight of the polymethacrylate is in a range of 25,000 to 55,000.

13. The lubricating oil composition according to claim 1, wherein the content of the polymethacrylate is in a range of 6% by mass to 10% by mass based on the total amount of the lubricating oil composition.

14. The lubricating oil composition according to claim 2, wherein the lubricating oil composition is formulated to have a kinematic viscosity at 100° C. in a range of 4 mm²/s to 7 mm²/s.

15. The lubricating oil composition according to claim 2, wherein the lubricating oil composition is formulated to have a viscosity index of 232 or more.

16. The lubricating oil composition according to claim 2, wherein the lubricating oil composition is formulated to have a rate of change in kinematic viscosity at 40° C. of 5% or less, as calculated with respect to an ultrasonically-treated composition obtained by irradiating the lubricating oil composition with ultrasonic waves for 60 minutes according to JASO M347-95 and an untreated lubricating oil composition, their kinematic viscosity at 40° C. ($v_1$, $v_0$) being measured according to JIS K2283:2000, and where a rate of reduction (($v_0-v_1$)/$v_0 \times 100$) is a rate of change in kinematic viscosity at 40° C.

17. The lubricating oil composition according to claim 2, wherein the lubricating oil composition is formulated to have a kinematic viscosity at 100° C. in a range of 4 mm²/s to 7 mm²/s and a viscosity index of 232 or more.

18. The lubricating oil composition according to claim 1 wherein the polymethacrylate further includes a structural unit of formula (II),

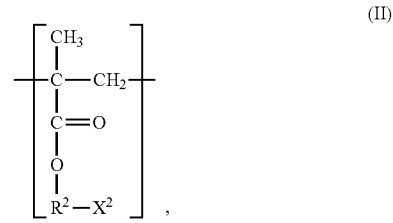

where $R^2$ is a divalent aliphatic hydrocarbon group having 1 to 40 carbon atoms, and $X^2$ is a monovalent functional group.

19. The lubricating oil composition according to claim 1 further comprising:
a dispersant.

20. The lubricating oil composition according to claim 3, wherein the lubricating oil composition is formulated to have a kinematic viscosity at 100° C. in a range of 4 mm²/s to 7 mm²/s.

* * * * *